(12) United States Patent
Boyce et al.

(10) Patent No.: US 7,376,186 B2
(45) Date of Patent: May 20, 2008

(54) MOTION ESTIMATION WITH WEIGHTING PREDICTION

(75) Inventors: Jill MacDonald Boyce, Manalapan, NJ (US); Alan Jay Stein, Princeton Junction, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 700 days.

(21) Appl. No.: 10/410,479

(22) Filed: Apr. 9, 2003

(65) Prior Publication Data

US 2004/0008782 A1  Jan. 15, 2004

Related U.S. Application Data

(60) Provisional application No. 60/395,874, filed on Jul. 15, 2002, provisional application No. 60/395,843, filed on Jul. 15, 2002.

(51) Int. Cl.
*H04N 7/18* (2006.01)

(52) U.S. Cl. .................. 375/240.15; 375/240.16; 375/240.17

(58) Field of Classification Search .................. 375/240.01–240.29
See application file for complete search history.

(56) References Cited

U.S. PATENT DOCUMENTS

| | | | |
|---|---|---|---|
| 5,436,665 A | 7/1995 | Ueno et al. | |
| 5,488,482 A | 1/1996 | Ueda et al. | |
| 5,592,228 A | 1/1997 | Dachiku et al. | 348/416 |
| 5,781,788 A | 7/1998 | Woo et al. | 395/800.01 |
| 6,049,362 A * | 4/2000 | Butter et al. | 348/699 |
| 6,081,551 A | 6/2000 | Etoh | |
| 6,104,439 A * | 8/2000 | Jeong et al. | 348/699 |
| 6,108,040 A | 8/2000 | Moteki et al. | 348/416 |
| 6,122,318 A | 9/2000 | Yamaguchi et al. | |
| 6,151,075 A | 11/2000 | Shin et al. | 348/459 |
| 6,175,592 B1 | 1/2001 | Kim et al. | 375/240 |
| 6,292,514 B1 | 9/2001 | Yamaguchi et al. | 375/240.21 |
| 6,704,358 B1 * | 3/2004 | Li et al. | 375/240.02 |

OTHER PUBLICATIONS

European Search Report Enclosed.
Y. Kikuchi, T. Chujoh, S. Kadono, "Multi-frame interpolative prediction with modified syntax", JVT-C066, Mar. 2002.
Y. Kikuchi, T. Chujoh, "Improved multiple frame motion compensation using frame interpolation", JTV-B075, Jan.-Feb. 2002.
Thomas Wiegand, "Joint Committee Draft (CD)", JVT-C167, May 2002.

* cited by examiner

*Primary Examiner*—Andy Rao
(74) *Attorney, Agent, or Firm*—Joseph J. Laks; Paul P. Kiel; Guy H. Eriksen

(57) ABSTRACT

A video encoder and decoder are provided for encoding and decoding video signal data for an image block and a particular reference picture index to predict the image block, where the encoder includes a reference picture weighting factor selector having an output indicative of a weighting factor corresponding to the particular reference picture index, a multiplier in signal communication with the reference picture weighting factor selector for providing a weighted version of the reference picture, and a motion estimator in signal communication with the multiplier for providing motion vectors corresponding to the weighted version of the reference picture; and the corresponding decoder a reference picture weighting factor unit having an output for determining a weighting factor corresponding to the particular reference picture index.

16 Claims, 5 Drawing Sheets

MOTION ESTIMATION WITH WEIGHTING PREDICTION

CROSS-REFERENCE TO RELATED APPLICATIONS

This application claims the benefit of U.S. Provisional Patent Application Ser. No. 60/395,874, entitled "Motion Estimation With Weighting Prediction" and filed Jul. 15, 2002, which is incorporated by reference herein in its entirety. In addition, this application claims the benefit of U.S. Provisional Patent Application Ser. No. 60/395,843, entitled "Adaptive Weighting Of Reference Pictures In Video CODEC" also filed Jul. 15, 2002, which is incorporated by reference herein in its entirety.

FIELD OF THE INVENTION

The present invention is directed towards video encoders and decoders, and in particular, towards integrated motion estimation with weighting prediction in video encoders and decoders.

BACKGROUND OF THE INVENTION

Video data is generally processed and transferred in the form of bit streams. Typical video compression coders and decoders ("CODECs") gain much of their compression efficiency by forming a reference picture prediction of a picture to be encoded, and encoding the difference between the current picture and the prediction. The more closely that the prediction is correlated with the current picture, the fewer bits that are needed to compress that picture, thereby increasing the efficiency of the process. Thus, it is desirable for the best possible reference picture prediction to be formed.

In many video compression standards, including Moving Picture Experts Group ("MPEG")-1, MPEG-2 and MPEG-4, a motion compensated version of a previous reference picture is used as a prediction for the current picture, and only the difference between the current picture and the prediction is coded. When a single picture prediction ("P" picture) is used, the reference picture is not scaled when the motion compensated prediction is formed. When bidirectional picture predictions ("B" pictures) are used, intermediate predictions are formed from two different pictures, and then the two intermediate predictions are averaged together, using equal weighting factors of (½, ½) for each, to form a single averaged prediction. In these MPEG standards, the two reference pictures are always one each from the forward direction and the backward direction for B pictures.

SUMMARY OF THE INVENTION

These and other drawbacks and disadvantages of the prior art are addressed by a system and method for integrated motion estimation with weighting prediction in video encoders and decoders.

A video encoder and decoder are provided for encoding and decoding video signal data for an image block and a particular reference picture index to predict the image block, where the encoder includes a reference picture weighting factor selector having an output indicative of a weighting factor corresponding to the particular reference picture index, a multiplier in signal communication with the reference picture weighting factor selector for providing a weighted version of the reference picture, and a motion estimator in signal communication with the multiplier for providing motion vectors corresponding to the weighted version of the reference picture; and the corresponding decoder a reference picture weighting factor unit having an output for determining a weighting factor corresponding to the particular reference picture index.

A corresponding method for encoding video signal data for an image block includes receiving a substantially uncompressed image block, assigning a weighting factor for the image block corresponding to a particular reference picture, weighting the reference picture by the weighting factor, computing motion vectors corresponding to the difference between the image block and the weighted reference picture, motion compensating the weighted reference picture in correspondence with the motion vectors, refining the weighting factor selection in response to the motion compensated weighted reference picture, motion compensating the original unweighted reference picture in correspondence with the motion vectors, multiplying the motion compensated original reference picture by the assigned weighting factor to form a weighted motion compensated reference picture, subtracting the weighted motion compensated reference picture from the substantially uncompressed image block, and encoding a signal indicative of the difference between the substantially uncompressed image block and the weighted motion compensated reference picture.

These and other aspects, features and advantages of the present invention will become apparent from the following description of exemplary embodiments, which is to be read in connection with the accompanying drawings.

BRIEF DESCRIPTION OF THE DRAWINGS

The present invention incorporates integrated motion estimation with weighting prediction in video encoders and decoders in accordance with the following exemplary figures, in which.

DETAILED DESCRIPTION OF PREFERRED EMBODIMENTS

Figure 1:
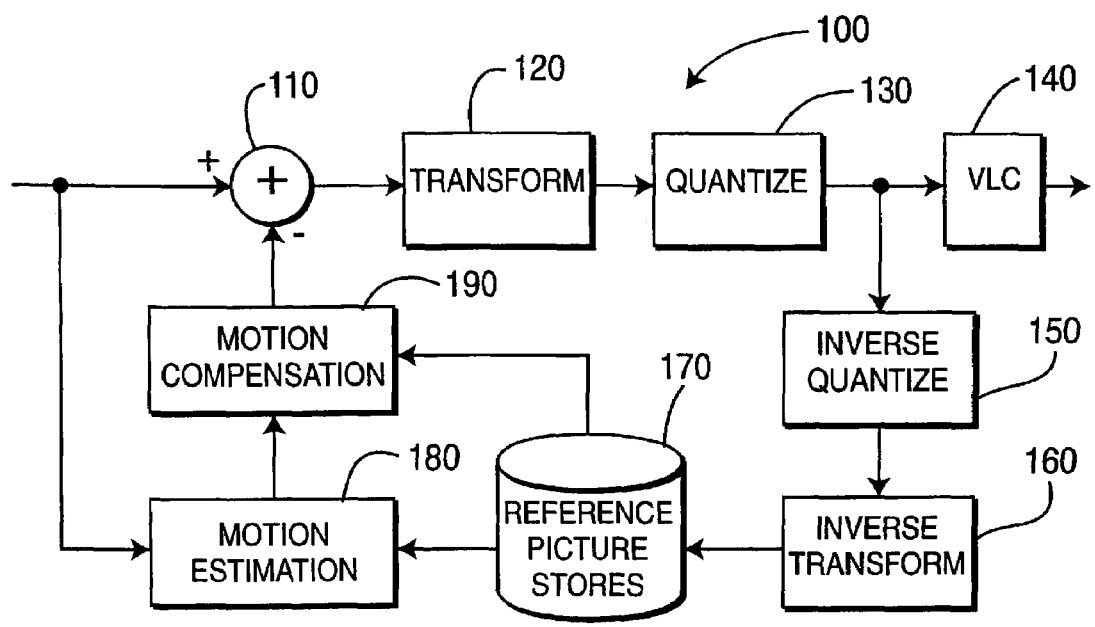
FIG. 1 shows a block diagram for a standard video encoder.

An efficient process is provided for integrated motion vector estimation and adaptive reference picture weighting factor selection. An iterative process is used where an initial weighting factor is estimated and used in the motion estimation process. The weighting factor estimate is refined based on the results of the motion estimation process. When weighting factors are used in encoding, a video encoder determines both weighting factors and motion vectors, but the best choice for each of these depends on the other. Motion estimation is typically the most computationally intensive part of a digital video compression encoder.

In some video sequences, in particular those with fading, the current picture or image block to be coded is more strongly correlated to a reference picture scaled by a weighting factor than to the reference picture itself. Video CODECs without weighting factors applied to reference pictures encode fading sequences very inefficiently.

In the proposed Joint Video Team ("JVT") video compression standard, each P picture can use multiple reference pictures to form a picture's prediction, but each individual motion block or 8×8 region of a macroblock uses only a single reference picture for prediction. In addition to coding and transmitting the motion vectors, a reference picture index is transmitted for each motion block or 8×8 region, indicating which reference picture is used. A limited set of possible reference pictures is stored at both the encoder and decoder, and the number of allowable reference pictures is transmitted.

In the JVT standard, for bi-predictive pictures (also called "B" pictures), two predictors are formed for each motion block or 8×8 region, each of which can be from a separate reference picture, and the two predictors are averaged together to form a single averaged predictor. For bi-predictively coded motion blocks, the reference pictures can both be from the forward direction, both be from the backward direction, or one each from the forward and backward directions. Two lists are maintained of the available reference pictures that may used for prediction. The two reference pictures are referred to as the list 0 and list 1 predictors. An index for each reference picture is coded and transmitted, ref_idx_l and ref_idx_l1, for the list 0 and list 1 reference pictures, respectively. Joint Video Team ("JVT") bi-predictive or "B" pictures shall allow adaptive weighting between the two predictions, i.e., $$Pred=[(P0)*(Pred0)]+[(P1)*(Pred1)]+D,$$

where P0 and P1 are weighting factors, Pred0 and Pred1 are the reference picture predictions for list 0 and list 1 respectively, and D is an offset.

Two methods have been proposed for indication of weighting factors. In the first, the weighting factors are determined by the directions that are used for the reference pictures. In this method, if the ref_idx_l0 index is less than or equal to ref_idx_l1, weighting factors of (½, ½) are used, otherwise (2, −1) factors are used.

In the second method, any number of weighting factors is transmitted for each slice. Then a weighting factor index is transmitted for each motion block or 8×8 region of a macroblock that uses bidirectional prediction. The decoder uses the received weighting factor index to choose the appropriate weighting factor, from the transmitted set, to use when decoding the motion block or 8×8 region. For example, if three weighting factors were sent at the slice layer, they would correspond to weight factor indices 0, 1 and 2, respectively.

The following description merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As shown in FIG. 1, a standard video encoder is indicated generally by the reference numeral 100. An input to the encoder 100 is connected in signal communication with a non-inverting input of a summing junction 110. The output of the summing junction 110 is connected in signal communication with a block transform function 120. The transform 120 is connected in signal communication with a quantizer 130. The output of the quantizer 130 is connected in signal communication with a variable length coder ("VLC") 140, where the output of the VLC 140 is an externally available output of the encoder 100.

The output of the quantizer 130 is further connected in signal communication with an inverse quantizer 150. The inverse quantizer 150 is connected in signal communication with an inverse block transformer 160, which, in turn, is connected in signal communication with a reference picture store 170. A first output of the reference picture store 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

Figure 2:
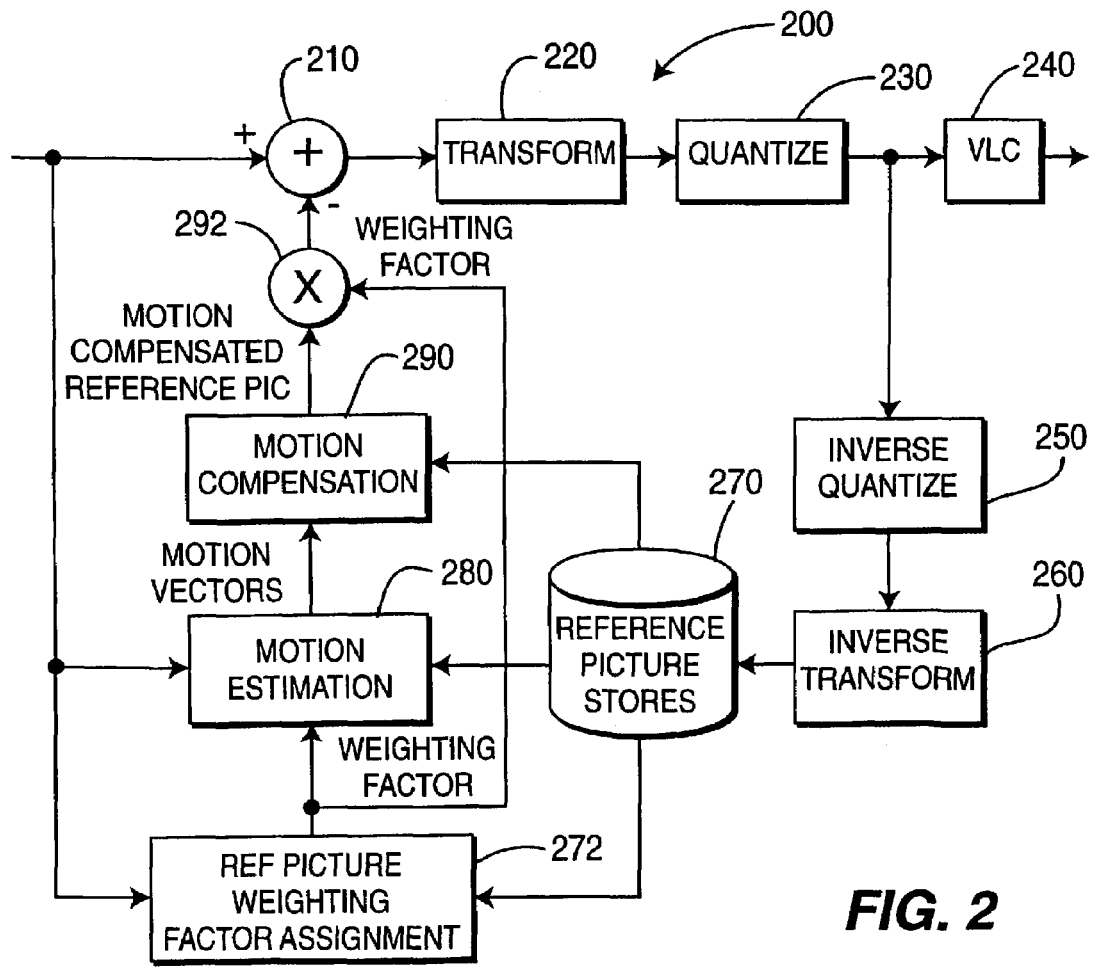
FIG. 2 shows a block diagram for a video encoder with reference picture weighting.

Turning to FIG. 2, a video encoder with reference picture weighting is indicated generally by the reference numeral 200. An input to the encoder 200 is connected in signal communication with a non-inverting input of a summing junction 210. The output of the summing junction 210 is connected in signal communication with a block transformer 220. The transformer 220 is connected in signal communication with a quantizer 230. The output of the quantizer 230 is connected in signal communication with a VLC 240, where the output of the VLC 440 is an externally available output of the encoder 200.

The output of the quantizer 230 is further connected in signal communication with an inverse quantizer 250. The inverse quantizer 250 is connected in signal communication with an inverse block transformer 260, which, in turn, is connected in signal communication with a reference picture store 270. A first output of the reference picture store 270 is connected in signal communication with a first input of a reference picture weighting factor assigner 272. The input to the encoder 200 is further connected in signal communication with a second input of the reference picture weighting factor assigner 272. The output of the reference picture weighting factor assigner 272, which is indicative of a weighting factor, is connected in signal communication with a first input of a motion estimator 280. A second output of the reference picture store 270 is connected in signal communication with a second input of the motion estimator 280.

The input to the encoder 200 is further connected in signal communication with a third input of the motion estimator 280. The output of the motion estimator 280, which is indicative of motion vectors, is connected in signal communication with a first input of a motion compensator 290. A third output of the reference picture store 270 is connected in signal communication with a second input of the motion compensator 290. The output of the motion compensator 290, which is indicative of a motion compensated reference picture, is connected in signal communication with a first input of a multiplier 292. The output of the reference picture weighting factor assigner 272, which is indicative of a weighting factor, is connected in signal communication with a second input of the multiplier 292. The output of the multiplier 292 is connected in signal communication with an inverting input of the summing junction 210.

Figure 3:
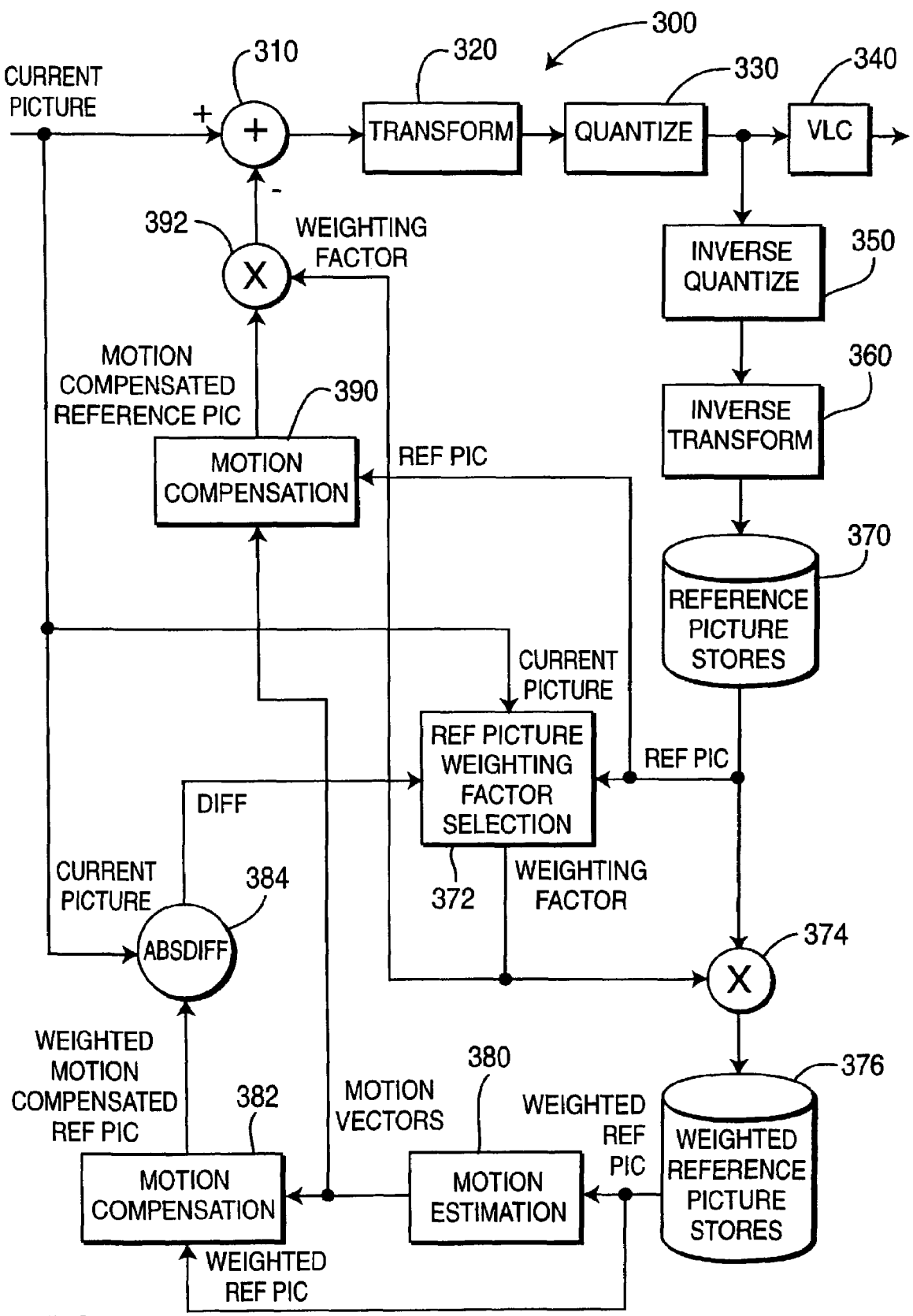
FIG. 3 shows a block diagram for a video encoder with integrated motion estimation and weighting prediction in accordance with the principles of the present invention.

Turning now to FIG. 3, a video encoder with integrated motion estimation and weighting prediction is indicated generally by the reference numeral 300. An input to the encoder 300 is connected in signal communication with a non-inverting input of a summing junction 310. The output of the summing junction 310 is connected in signal communication with a block transformer 320. The transformer 320 is connected in signal communication with a quantizer 330. The output of the quantizer 330 is connected in signal communication with a VLC 340, where the output of the VLC 440 is an externally available output of the encoder 300.

The output of the quantizer 330 is further connected in signal communication with an inverse quantizer 350. The inverse quantizer 350 is connected in signal communication with an inverse block transformer 360, which, in turn, is connected in signal communication with a reference picture store 370. A first output of the reference picture store 370 is connected in signal communication with a first input of a reference picture weighting factor selector 372. The input to the encoder 300 is further connected in signal communication with a second input of the reference picture weighting factor selector 372 to provide the current picture to the selector. The output of the reference picture weighting factor selector 372, which is indicative of a weighting factor, is connected in signal communication with a first input of a multiplier 374. A second input of the multiplier 374 is connected in signal communication with the reference picture output of the reference picture store 370. It should be noted that although shown simply as a multiplier 374, other types of weighting factor applicators may be constructed other than a multiplier, as would be apparent to those of ordinary skill in the art, all of which are contemplated within the spirit and scope of the invention.

The output of the multiplier 374 is connected in signal communication with a weighted reference picture store 376. The output of the weighted reference picture store 376 is connected in signal communication with a first input of a motion estimator 380 for providing a weighted reference picture. The output of the motion estimator 380 is connected in signal communication with a first motion compensator 382 for providing motion vectors. The output of the motion estimator 380 is further connected in signal communication with a first input of a second motion compensator 390. A second output of the weighted reference picture store 376 is connected in signal communication with a second input of the first motion compensator 382.

The output of the first motion compensator 382, which is indicative of a weighted motion compensated reference picture, is connected in signal communication with a first input of an absolute difference generator 384. The input to the encoder 300, which is the current picture, is further connected in signal communication with a second input of the absolute difference generator 384. The output of the absolute difference function 384 is connected in signal communication with a third input of the reference picture weighting factor selector 372.

A third output of the reference picture store 370 is connected in signal communication with a second input of the second motion compensator 390. The output of the second motion compensator 390, which is indicative of a motion compensated reference picture, is connected in signal communication with a first input of a multiplier 392. The output of the reference picture weighting factor selector 372, which is indicative of a weighting factor, is connected in signal communication with a second input of the multiplier 392. The output of the multiplier 392 is connected in signal communication with an inverting input of the summing junction 310.

Figure 4:
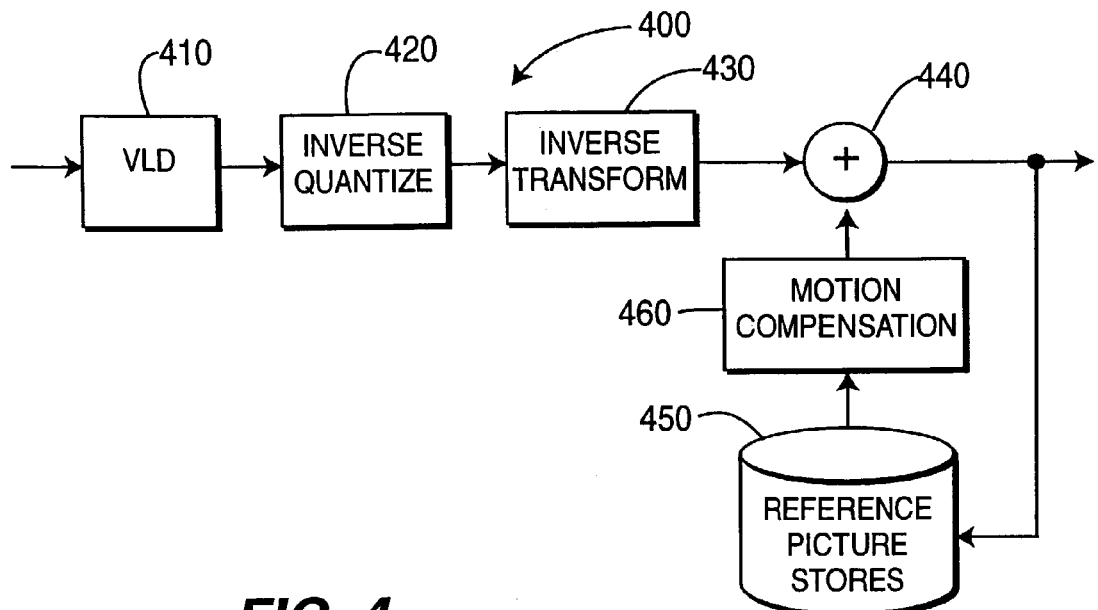
FIG. 4 shows a block diagram for a standard video decoder.

As shown in FIG. 4 a standard video decoder is indicated generally by the reference numeral 400. The video decoder 400 includes a variable length decoder ("VLD") 410 connected in signal communication with an inverse quantizer 420. The inverse quantizer 420 is connected in signal communication with an inverse transformer 430. The inverse transformer 430 is connected in signal communication with a first input terminal of an adder or summing junction 440, where the output of the summing junction 440 provides the output of the video decoder 400. The output of the summing junction 440 is connected in signal communication with a reference picture store 450. The reference picture store 450 is connected in signal communication with a motion compensator 460, which is connected in signal communication with a second input terminal of the summing junction 440.

Figure 5:
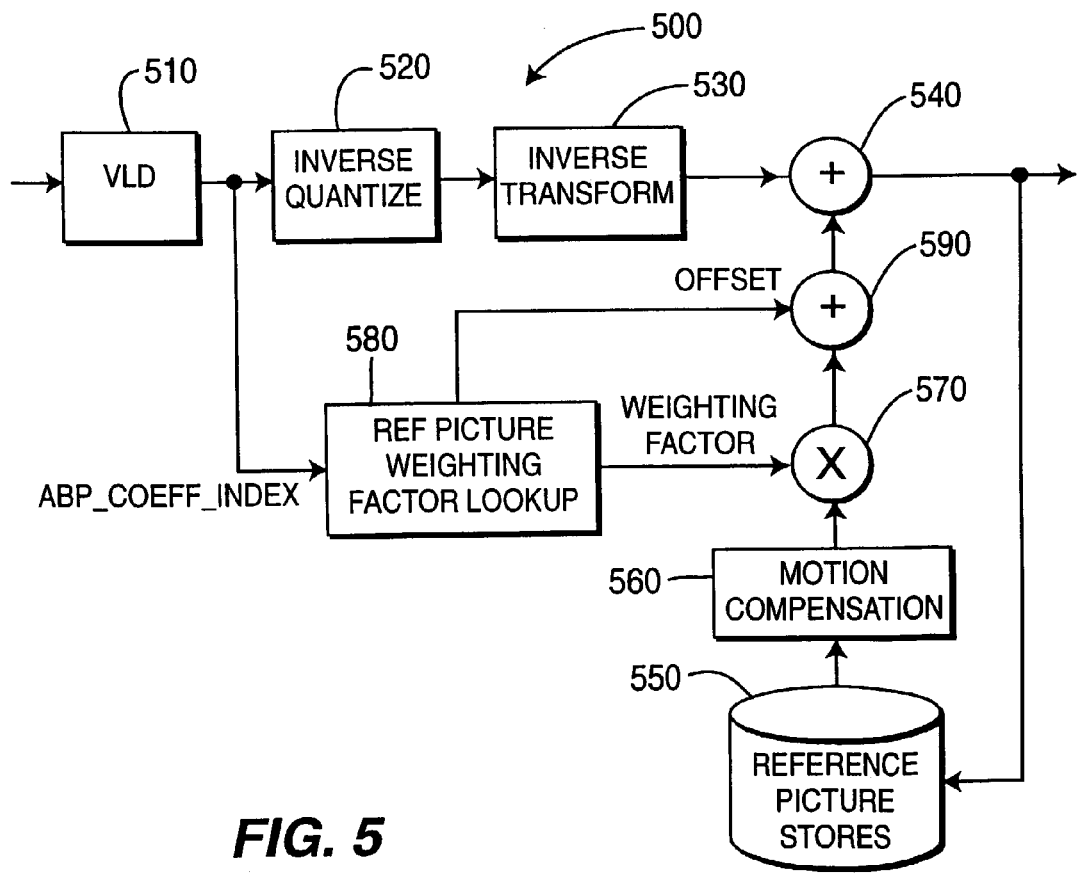
FIG. 5 shows a block diagram for a video decoder with adaptive bi-prediction.

Turning to FIG. 5 a video decoder with adaptive bi-prediction is indicated generally by the reference numeral 500. The video decoder 500 includes a VLD 510 connected in signal communication with an inverse quantizer 520. The inverse quantizer 520 is connected in signal communication with an inverse transformer 530. The inverse transformer 530 is connected in signal communication with a first input terminal of a summing junction 540, where the output of the summing junction 540 provides the output of the video decoder 500. The output of the summing junction 540 is connected in signal communication with a reference picture store 550. The reference picture store 550 is connected in signal communication with a motion compensator 560, which is connected in signal communication with a first input of a multiplier 570.

The VLD 510 is further connected in signal communication with a reference picture weighting factor lookup 580 for providing an adaptive bi-prediction ("ABP") coefficient index to the lookup 580. A first output of the lookup 580 is for providing a weighting factor, and is connected in signal communication to a second input of the multiplier 570. The output of the multiplier 570 is connected in signal communication to a first input of a summing junction 590. A second output of the lookup 580 is for providing an offset, and is connected in signal communication to a second input of the summing junction 590. The output of the summing junction 590 is connected in signal communication with a second input terminal of the summing junction 540.

Figure 6:
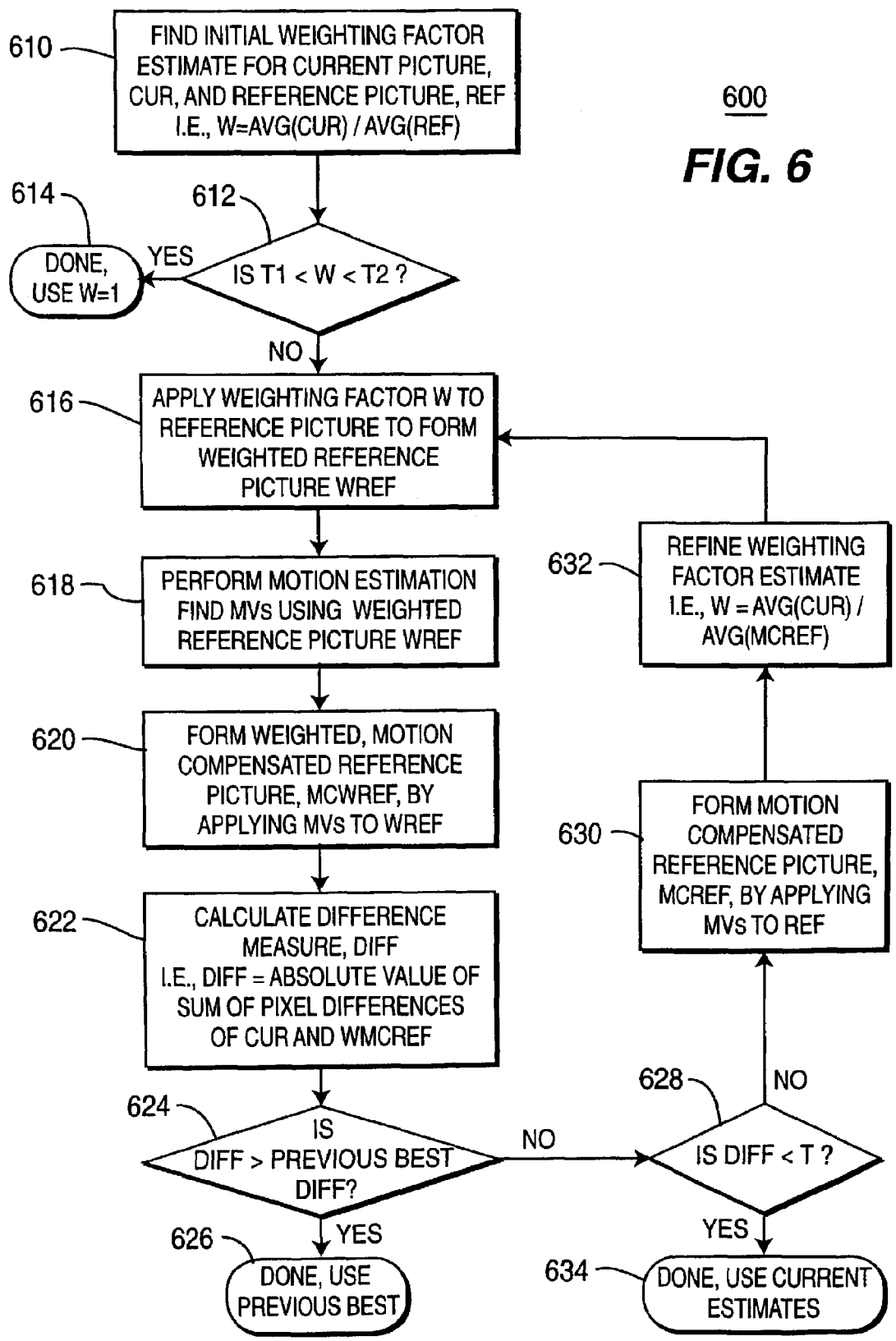
FIG. 6 shows a flowchart for an encoding process in accordance with the principles of the present invention.

Turning now to FIG. 6, a motion vector and weighting factor determination process is indicated generally by the reference numeral 600. Here, a function block 610 finds the initial weighting factor estimate for the current picture or image block ("cur") and reference picture ("ref") by computing the weighting factor "w"=avg(cur)/avg(ref). The block 610 passes control to a decision block 612 that determines whether the weighting factor w is greater than a threshold value T1 and less than a threshold value T2. If w is between T1 and T2, control is passed to a return block 614 and w=1 is used as the initial weighting factor. If w is not between T1 and T2, control is passed to a function block 616 that applies the weighting factor w to the reference picture to form a weighted reference picture wref. The block 616 passes control to a function block 618 to perform motion estimation by finding motion vectors ("MVs") using the weighted reference picture wref. The block 618 passes control to a function block 620 that forms a motion compensated weighted reference picture, mcwref, by applying the MVs to wref. The block 620 passes control to a function block 622 that calculates a difference measure, diff, where diff equals the absolute value of the sum of the pixel differences between cur and wmcref.

The block 622 passes control to a decision block 624 that determines whether diff is greater than the previous best diff. If diff is greater than the previous best diff, control is passed to a return block 626, which uses the previous best diff. If diff is not greater than the previous best diff, control is passed to a decision block 628 that determines whether diff is less than a threshold T. If diff is less than the threshold T, then control is passed to a return block 634 that uses the current estimates. If diff is not less than the threshold T, then control is passed to a function block 630 that forms a motion compensated reference picture, mcref, by applying the MVs to ref. The block 630 passes control to a function block 632 that refines the weighting factor estimate by setting w equal to avg(cur)/avg(mcref). The block 632 passes control back to the function block 616 for further processing. Thus, the decision to further refine the weighting factor is based on comparing a difference measure to a threshold or tolerance.

Figure 7:
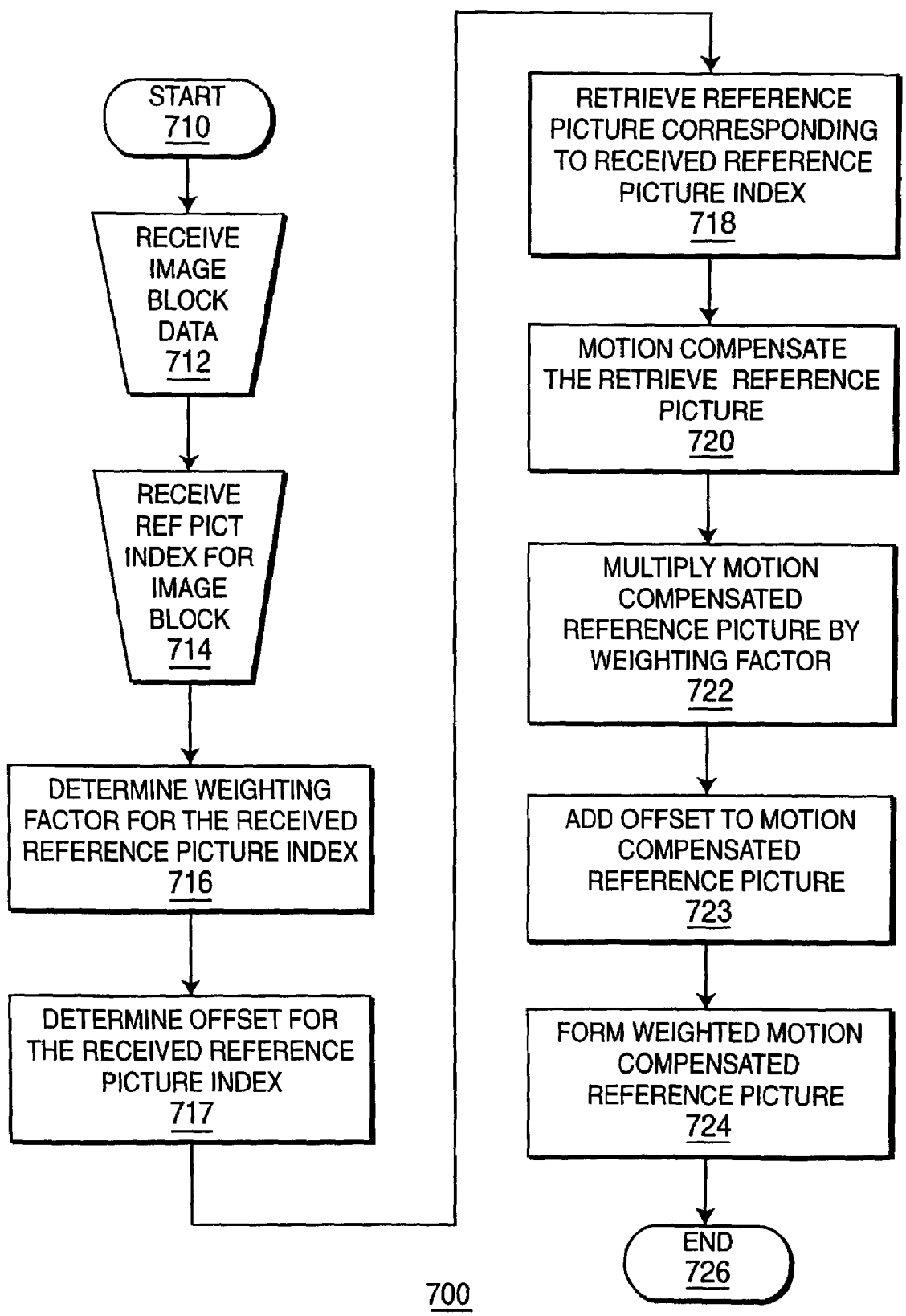
FIG. 7 shows a flowchart for a decoding process in accordance with the principles of the present invention.

Turning now to FIG. 7 an exemplary process for decoding video signal data for an image block is indicated generally by the reference numeral 700. The process includes a start block 710 that passes control to an input block 712. The input block 712 receives the image block compressed data, and passes control to an input block 714. The input block 714 receives at least one reference picture index with the data for the image block, each reference picture index corresponding to a particular reference picture. The input block 714 passes control to a function block 716, which determines a weighting factor corresponding to each of the received reference picture indices, and passes control to an optional function block 717. The optional function block 717 determines an offset corresponding to each of the received reference picture indices, and passes control to a function block 718. The function block 718 retrieves a reference picture corresponding to each of the received reference picture indices, and passes control to a function block 720. The function block 720, in turn, motion compensates the retrieved reference picture, and passes control to a function block 722. The function block 722 multiplies the motion compensated reference picture by the corresponding weighting factor, and passes control to an optional function block 723. The optional function block 723 adds the motion compensated reference picture to the corresponding offset, and passes control to a function block 724. The function block 724, in turn, forms a weighted motion compensated reference picture, and passes control to an end block 726.

In the present exemplary embodiment, for each coded picture or slice, a weighting factor is associated with each allowable reference picture that blocks of the current picture can be encoded with respect to. When each individual block in the current picture is encoded or decoded, the weighting factor(s) and offset(s) that correspond to its reference picture indices are applied to the reference prediction to form a weight predictor. All blocks in the slice that are coded with respect to the same reference picture apply the same weighting factor to the reference picture prediction.

Whether or not to use adaptive weighting when coding a picture can be indicated in the picture parameter set or sequence parameter set, or in the slice or picture header. For each slice or picture that uses adaptive weighting, a weighting factor may be transmitted for each of the allowable reference pictures that may be used for encoding this slice or picture. The number of allowable reference pictures is transmitted in the slice header. For example, if three reference pictures can be used to encode the current slice, up to three weighting factors are transmitted, and they are associated with the reference picture with the same index.

If no weighting factors are transmitted, default weights are used. In one embodiment of the present invention, default weights of (½,½) are used when no weighting factors are transmitted. The weighting factors may be transmitted using either fixed or variable length codes.

Unlike typical systems, each weighting factor that is transmitted with each slice, block or picture corresponds to a particular reference picture index. Previously, any set of weighting factors transmitted with each slice or picture was not associated with any particular reference pictures.

Instead, an adaptive bi-prediction weighting index was transmitted for each motion block or 8×8 region to select which of the weighting factors from the transmitted set was to be applied for that particular motion block or 8×8 region.

In the instant embodiment of the present invention, the weighting factor index for each motion block or 8×8 region is not explicitly transmitted. Instead, the weighting factor that is associated with the transmitted reference picture index is used. This dramatically reduces the amount of overhead in the transmitted bitstream to allow adaptive weighting of reference pictures.

This system and technique may be applied to either Predictive "P" pictures, which are encoded with a single predictor, or to Bi-predictive "B" pictures, which are encoded with two predictors. The decoding processes, which are present in both encoder and decoders, are described below for the P and B picture cases. Alternatively, this technique may also be applied to coding systems using the concepts similar to I, B, and P pictures.

The same weighting factors can be used for single directional prediction in B pictures and for bi-directional prediction in B pictures. When a single predictor is used for a macroblock, in P pictures or for single directional prediction in B pictures, a single reference picture index is transmitted for the block. After the decoding process step of motion compensation produces a predictor, the weighting factor is applied to predictor. The weighted predictor is then added to the coded residual, and clipping is performed on the sum, to form the decoded picture. For use for blocks in P pictures or for blocks in B pictures that use only list 0 prediction, the weighted predictor is formed as:

$$Pred = W0 * Pred0 + D0 \quad (1)$$

where W0 is the weighting factor associated with the list 0 reference picture, D0 is the offset associated with the list 0 reference picture, and Pred0 is the motion-compensated prediction block from the list 0 reference picture.

For use for blocks in B pictures that use only list 0 prediction, the weighted predictor is formed as:

$$Pred = W1 * Pred1 + D1 \quad (2)$$

where W1 is the weighting factor associated with the list 1 reference picture, D0 is the offset associated with the list 1 reference picture, and Pred1 is the motion-compensated prediction block from the list 1 reference picture.

The weighted predictors may be clipped to guarantee that the resulting values will be within the allowable range of pixel values, typically 0 to 255. The precision of the multiplication in the weighting formulas may be limited to any pre-determined number of bits of resolution.

In the bi-predictive case, reference picture indexes are transmitted for each of the two predictors. Motion compensation is performed to form the two predictors. Each predictor uses the weighting factor associated with its reference picture index to form two weighted predictors. The two weighted predictors are then averaged together to form an averaged predictor, which is then added to the coded residual.

For use for blocks in B pictures that use list 0 and list 1 predictions, the weighted predictor is formed as:

$$Pred = (P0 * Pred0 + D0 + P1 * Pred1 + D1)/2 \quad (3)$$

Clipping may be applied to the weighted predictor or any of the intermediate values in the calculation of the weighted predictor to guarantee that the resulting values will be within the allowable range of pixel values, typically 0 to 255.

Thus, a weighting factor is applied to the reference picture prediction of a video compression encoder and decoder that uses multiple reference pictures. The weighting factor adapts for individual motion blocks within a picture, based on the reference picture index that is used for that motion block. Because the reference picture index is already transmitted in the compressed video bitstream, the additional overhead to adapt the weighting factor on a motion block basis is dramatically reduced. All motion blocks that are coded with respect to the same reference picture apply the same weighting factor to the reference picture prediction.

Motion estimation techniques have been widely studied. For each motion block of a picture being coded, a motion vector is chosen that represents a displacement of the motion block from a reference picture. In an exhaustive search method within a search region, every displacement within a pre-determined range of offsets relative to the motion block position is tested. The test includes calculating the sum of the absolute difference ("SAD") or mean squared error ("MSE") of each pixel in the motion block in the current picture with the displaced motion block in a reference picture. The offset with the lowest SAD or MSE is selected as the motion vector. Numerous variations on this technique have been proposed, such as three-step search and rate-distortion optimized motion estimation, all of which include the step of computing the SAD or MSE of the current motion block with a displaced motion block in a reference picture.

Computational costs of determining motion vectors and adaptive reference picture weighting factors can be reduced by using an iterative process, while still selecting motion vectors and weighting factors that are able to achieve high compression efficiencies. An exemplary embodiment motion vector and weighting factor determination process is described assuming that a single weighting factor is applied to the entire reference picture, although application of the principles of the present invention are not limited to such a case. The process could also be applied over smaller regions of the picture, such as slices, for example. In addition, although one exemplary embodiment of the invention is described as using only a single reference picture, the present invention may also be applied to multiple reference picture prediction and to bi-predictive pictures.

Calculation of the motion vector for a motion block can typically best be done when the weighting factor to be used is known. In an exemplary embodiment, an estimate of the weighting factor is formed, using the reference picture and the current picture pixel values. The weighting factor may be limited to a number of bits of resolution. If the weighting factor is very close to 1, there is no need to consider the weighting factor in the motion estimation process, and normal motion estimation can be done with the weighting factor assumed to be equal to 1. Otherwise, the weighting factor estimate is applied to the reference picture. Motion estimation is then performed using any method which calculates SAD or MSE, but with the SAD or MSE calculation performed between the current picture motion block and the displaced motion block in the weighted version of the reference picture, rather than the un-weighted reference picture. After motion vectors have been selected, the estimation of the weighting factor can be refined, if necessary.

The current motion vectors are applied to the weighted reference picture to form the weighted, motion compensated reference picture. A difference measure between the weighted, motion compensated reference picture and the current picture is computed. If the difference measure is lower than a threshold, or lower than the previous best difference measure, the process is complete, and the current candidate motion vectors and weighting factor are accepted.

If the difference measure is higher than some threshold, the weighting factor can be refined. In this case, a motion compensated but un-weighted reference picture is formed based on the current candidate motion vectors. The weighting factor estimate is refined using the motion compensated reference picture and the current picture, rather than using the un-compensated reference picture, as was done in forming the initial estimate of the weighting factor.

The selection process proceeds to iterate, applying the newly refined weighting factor to the reference picture to form the weighted reference picture. The iterative process continues until the difference measure is equal or higher than a previous best difference measure, or lower than a threshold, or alternatively, until a defined number of cycles has been completed. If the difference measure of the current iteration is higher than for the best previous iteration, the weighting factor and motion vectors for the best previous iteration are used. If the difference measure of the current iteration is less than a threshold, the current weighting factor and motion vectors are used. If the maximum number of iteration cycles has been completed, the weighting factor and motion vectors from the previous iteration that had the best difference measure are used.

In one embodiment, the initial estimate of the weighting factor, w, is the ratio between the average value of the pixels in the current picture, cur, divided by the average value of the pixels in the reference picture, ref, where:

$$w = avg(cur)/avg(ref) \quad (4)$$

The refinement estimates are the ratio between the average of pixels in the current picture and the average of pixels in the motion compensated reference picture, mcref, where:

$$w = avg(cur)/avg(mcref) \quad (5)$$

The difference measure diff is the absolute value of the average of pixel differences between the current picture, cur, and the weighted motion compensated reference picture, wmcref, where:

$$diff = |\Sigma cur - wmcref| \quad (6)$$

In another embodiment, the difference measure is the sum of the absolute differences of the pixels in the current picture and in the weighed motion compensated reference picture, where:

$$diff = \Sigma |cur - wmcref| \quad (7)$$

When block-based motion estimation is performed, the same pixel in a reference picture is used for numerous SAD calculations. In an exemplary embodiment during the motion estimation process, once a weighting factor has been applied to a pixel in a reference picture, the weighted pixel is stored, in addition to the normal pixel. The storage may be done either for a region of the picture, or for the entire picture.

The weighted reference picture values may be clipped to be stored with the same number of bits as an unweighted reference, such as 8 bits, for example, or may stored using more bits. If clipping is performed for the motion compensation process, which is more memory efficient, the weighting factor is reapplied to the reference picture for the actual selected motion vector, the difference is calculated using additional bits, and the clipping is performed after the difference in order to avoid mismatch with a decoder, which might otherwise occur if the decoder does not perform clipping after the weighting factor is applied.

When multiple reference pictures are used to encode a picture, a separate weighting factor can be calculated for each reference picture. During motion estimation, a motion vector and a reference picture index are selected for each motion block. For each iteration of the process, motion vectors and weighting factors are found for each reference picture.

In a preferred embodiment, during motion estimation, the best reference picture for a given motion block is determined. Calculation of the difference measure is done separately for each reference picture, with only those motion blocks that use that reference picture being used in the calculation. Refinement of the weighting factor estimate for a given reference picture also uses only those motion blocks that are coded using that reference picture. For bi-predictive coding, weighting factors and motion vectors can be determined separately for each of the two predictions, which will be averaged together to form the averaged prediction.

The principles of the present invention can be applied to many different types of motion estimation algorithms. When used with hierarchical approaches, the iteration of weighting factor selection and motion vector selection can be used with any level of the motion estimation hierarchy. For example, the iterative approach could be used with integer picture element ("pel") motion estimation. After the weighting factor and integer motion vectors are found using the provided iterative algorithm, the sub-pel motion vectors may be found without requiring another iteration of the weighting factor selection.

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof.

Most preferably, the principles of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for encoding video signal data for an image block, the method comprising:
   receiving a substantially uncompressed image block;
   assigning a weighting factor for the image block corresponding to a particular reference picture;
   weighting the reference picture by the weighting factor;
   computing motion vectors corresponding to the difference between the image block and the weighted reference picture; and
   motion compensating the weighted reference picture in correspondence with the motion vectors;
   wherein bi-predictive picture predictors are used, and the method further comprises:
   assigning a second weighting factor for the image block corresponding to a second particular reference picture;
   weighting the second reference picture by the second weighting factor;
   computing second motion vectors corresponding to the difference between the image block and the second weighted reference picture; and
   motion compensating the second weighted reference picture in correspondence with the second motion vectors.

2. A method as defined in claim 1, further comprising:
   motion compensating the original unweighted reference picture in correspondence with the motion vectors;
   multiplying the motion compensated original reference picture by the assigned weighting factor to form a weighted motion compensated reference picture;
   subtracting the weighted motion compensated reference picture from the substantially uncompressed image block; and
   encoding a signal indicative of the difference between the substantially uncompressed image block and the weighted motion compensated reference picture.

3. A method as defined in claim 1 wherein computing motion vectors comprises:
   testing within a search region for every displacement within a pre-determined range of offsets relative to the image block;
   calculating at least one of the sum of the absolute difference and the mean squared error of each pixel in the image block with a motion compensated reference picture; and
   selecting the offset with the lowest sum of the absolute difference and mean squared error as the motion vector.

4. A method as defined in claim 2 the method further comprising:
   motion compensating the original unweighted second reference picture in correspondence with the second motion vectors;
   multiplying the motion compensated original second reference picture by the assigned second weighting factor to form a second weighted motion compensated reference picture;
   subtracting the second weighted motion compensated reference picture from the substantially uncompressed image block; and
   encoding a signal indicative of the difference between the substantially uncompressed image block and the second weighted motion compensated reference picture.

5. A method as defined in claim 1 wherein the first and second particular reference pictures are both from the same direction relative to the image block.

6. A method as defined in claim 1 wherein computing motion vectors comprises:
   testing within a search region for every displacement within a pre-determined range of offsets relative to the image block;
   calculating at least one of the sum of the absolute difference and the mean squared error of each pixel in the image block with a first motion compensated reference picture corresponding to the first predictor;
   selecting an offset with the lowest sum of the absolute difference and mean squared error as the motion vector for the first predictor;
   calculating at least one of the sum of the absolute difference and the mean squared error of each pixel in the image block with a second motion compensated reference picture corresponding to the second predictor; and
   selecting an offset with the lowest sum of the absolute difference and mean squared error as the motion vector for the second predictor.

7. A method as defined in claim 1 wherein weighting the reference picture by the weighting factor comprises:
   determining whether the weighting factor is close to about 1; and
   using the original reference picture as the weighted reference picture if the weighting factor is close to about 1.

8. A method as defined in claim 1 wherein refining the weighting factor selection in response to the motion compensated weighted reference picture comprises:
   calculating a difference between the image block and the motion compensated weighted reference picture;
   comparing the calculated difference to a pre-determined tolerance; and
   further refining the weighting factor if the calculated difference is outside of the predetermined tolerance.

9. An apparatus for encoding video signal data for an image block, the method comprising:
   means for receiving a substantially uncompressed image block;
   means for assigning a weighting factor for the image block corresponding to a particular reference picture;
   means for weighting the reference picture by the weighting factor;
   means for computing motion vectors corresponding to the difference between the image block and the weighted reference picture; and
   means for motion compensating the weighted reference picture in correspondence with the motion vectors;
   wherein bi-predictive picture predictors are used, and the apparatus further comprises:
   means for assigning a second weighting factor for the image block corresponding to a second particular reference picture;
   means for weighting the second reference picture by the second weighting factor;
   means for computing second motion vectors corresponding to the difference between the image block and the second weighted reference picture; and
   means for motion compensating the second weighted reference picture in correspondence with the second motion vectors.

10. An apparatus as defined in claim 9, further comprising:

means for motion compensating the original unweighted reference picture in correspondence with the motion vectors;

means for multiplying the motion compensated original reference picture by the assigned weighting factor to form a weighted motion compensated reference picture;

means for subtracting the weighted motion compensated reference picture from the substantially uncompressed image block; and means for encoding a signal indicative of the difference between the substantially uncompressed image block and the weighted motion compensated reference picture.

11. An apparatus as defined in claim 10, the method further comprising:

motion compensating the original unweighted second reference picture in correspondence with the second motion vectors;

multiplying the motion compensated original second reference picture by the assigned second weighting factor to form a second weighted motion compensated reference picture;

subtracting the second weighted motion compensated reference picture from the substantially uncompressed image block; and encoding a signal indicative of the difference between the substantially uncompressed image block and the second weighted motion compensated reference picture.

12. An apparatus as defined in claim 9 wherein computing motion vectors comprises:

testing within a search region for every displacement within a pre-determined range of offsets relative to the image block;

calculating at least one of the sum of the absolute difference and the mean squared error of each pixel in the image block with a motion compensated reference picture; and selecting the offset with the lowest sum of the absolute difference and mean squared error as the motion vector.

13. An apparatus as defined in claim 9 wherein the first and second particular reference pictures are both from the same direction relative to the image block.

14. An apparatus as defined in claim 9 wherein computing motion vectors comprises:

testing within a search region for every displacement within a pre-determined range of offsets relative to the image block;

calculating at least one of the sum of the absolute difference and the mean squared error of each pixel in the image block with a first motion compensated reference picture corresponding to the first predictor;

selecting an offset with the lowest sum of the absolute difference and mean squared error as the motion vector for the first predictor;

calculating at least one of the sum of the absolute difference and the mean squared error of each pixel in the image block with a second motion compensated reference picture corresponding to the second predictor; and selecting an offset with the lowest sum of the absolute difference and mean squared error as the motion vector for the second predictor.

15. An apparatus as defined in claim 9 wherein weighting the reference picture by the weighting factor comprises:

determining whether the weighting factor is close to about 1; and using the original reference picture as the weighted reference picture if the weighting factor is close to about 1.

16. A method as defined in claim 9 wherein refining the weighting factor selection in response to the motion compensated weighted reference picture comprises:

calculating a difference between the image block and the motion compensated weighted reference picture;

comparing the calculated difference to a pre-determined tolerance; and further refining the weighting factor if the calculated difference is outside of the predetermined tolerance.

* * * * *